United States Patent
Cuellar et al.

(10) Patent No.: US 8,122,516 B2
(45) Date of Patent: Feb. 21, 2012

(54) METHOD AND SYSTEM FOR ENABLING A FIRST PARTY TO PROVIDE A SECOND PARTY WITH PERSONALIZED DIGITAL CONTENT

(75) Inventors: Jorge Cuellar, Baierbrunn (DE); Michael Marhöfer, Deisenhofen (DE); Hariharan Rajasekaran, München (DE)

(73) Assignee: Siemens Aktiengesellschaft, Munich (DE)

( * ) Notice: Subject to any disclaimer, the term of this patent is extended or adjusted under 35 U.S.C. 154(b) by 1162 days.

(21) Appl. No.: 11/918,072

(22) PCT Filed: Apr. 4, 2006

(86) PCT No.: PCT/EP2006/061308
§ 371 (c)(1), (2), (4) Date: Oct. 9, 2007

(87) PCT Pub. No.: WO2006/108778
PCT Pub. Date: Oct. 19, 2006

(65) Prior Publication Data
US 2009/0070862 A1   Mar. 12, 2009

(30) Foreign Application Priority Data
Apr. 8, 2005 (EP) .................................. 05007808

(51) Int. Cl.
*G06F 7/04* (2006.01)
*G06F 21/00* (2006.01)
(52) U.S. Cl. .................................... 726/28; 713/182
(58) Field of Classification Search .............. 726/28; 713/182
See application file for complete search history.

(56) References Cited

U.S. PATENT DOCUMENTS

| | | | |
|---|---|---|---|
| 7,630,986 B1 * | 12/2009 | Herz et al. | 1/1 |
| 7,676,829 B1 * | 3/2010 | Gui et al. | 726/5 |
| 2004/0019801 A1 | 1/2004 | Lindholm et al. | |
| 2005/0119971 A1 * | 6/2005 | Zito | 705/40 |
| 2006/0015358 A1 * | 1/2006 | Chua | 705/1 |
| 2006/0053296 A1 * | 3/2006 | Busboom et al. | 713/182 |

FOREIGN PATENT DOCUMENTS

| | | |
|---|---|---|
| EP | 1 416 406 | 5/2004 |
| WO | 2004/070538 | 8/2004 |

OTHER PUBLICATIONS

International Search Report issued in corresponding International Patent Application No. PCT/EP2006/061308, on Sep. 6, 2006.

* cited by examiner

*Primary Examiner* — Techane Gergiso
(74) *Attorney, Agent, or Firm* — Staas & Halsey LLP

(57) ABSTRACT

A method for enabling a first party to provide a second party with personalized digital content includes at a network unit: in response to receiving a request from a first party, the request including an identifier identifying a second party, retrieving identity credentials of the second party; and transmitting the identity credentials of the second part to a first party or to a content providing system; and in a content providing system: in response to receiving: a) an identifier from the first party, the identifier identifying digital content in a digital content storage, and b) the identity credentials of the second party, personalizing digital content using the identity credentials, the personalizing adapted to enable the second party to reproduce the digital content but to prevent any unauthorized party to reproduce it; and delivering the personalized digital content to the first party.

11 Claims, 2 Drawing Sheets

METHOD AND SYSTEM FOR ENABLING A FIRST PARTY TO PROVIDE A SECOND PARTY WITH PERSONALIZED DIGITAL CONTENT

CROSS REFERENCE TO RELATED APPLICATIONS

This application is based on and hereby claims priority to European Application No. EP05007808, filed on Apr. 8, 2005 and PCT Application No. PCT/EP2006/061308 filed on Apr. 4, 2006, the contents of which are hereby incorporated by reference.

BACKGROUND OF THE INVENTION

The invention relates to providing personalized digital content.

Digital content, especially in the form of encoded pieces of music or encoded video clips, is at present being distributed over the Internet to a steadily increasing extent.

When buying digital content over the Internet, some suppliers use some Digital Right Management DRM system—like the one disclosed in WO 2004/070538 A2—to protect digital content. In such a system, digital content is personalized before it is sold to a particular individual, meaning that the digital content can be reproduced by the party to whom it is sold but cannot be accessed by any unauthorized party. The personalization may comprise encryption, watermarking, fingerprinting or any other suitable encoding of the digital content that depends on the party or group of parties intended to use the digital content. In this context, a party can mean either a person or a device.

To efficiently enable personalization of digital content, the content distributor needs identity credentials at the time of purchase. The identity credentials may comprise any of the following: user identity, device certificates, credit card number, computer serial number, or pseudonyms.

At the moment it is not possible to give personalized digital content as a present. Instead, it is possible to buy a digital cash voucher which can then be given to someone. The party that has received the digital cash voucher can exchange it to get digital content of his or her choice equal to the value of the voucher. Usually, a digital cash voucher is valid only in the particular store that issued it. The well-known content providing system, itunes Music Store of Apple Computer, Inc. uses such a system, for example.

A problem related to giving a digital cash voucher as a present is that the party giving it cannot have enough control for which particular digital content the digital cash voucher will be used. The party giving a digital cash voucher as a present may furthermore feel that the present is impersonal. The party receiving a digital cash voucher needs to select digital content and perform some further acts it in order to get the digital content, which is clearly elaborate. It is assumed that at least partly because of these aspects, it is still more popular to give digital content in the form of a CD or a DVD as a present.

EP 1 416 406 A1 a licence information converter is taught with which a first licence information generated by a first content distribution system is transformed in that way, that is passable to others.

US 2004/00119801 A1 discloses a method and a system for secure content sharing in digital rights management environments.

SUMMARY OF THE INVENTION

One potential goal is to address the problem of not being able to give personalized digital content.

The inventors propose that if i) at a network unit, in response to receiving a request from a first party, the request comprising an identifier identifying a second party, identity credentials of the second party are retrieved, and then transmitted to the first party or to a content providing system, and ii) in a content providing system, in response to receiving: a) an identifier from the first party, the identifier identifying digital content in a digital content storage, and b) said identity credentials of the second party, digital content is personalized using said identity credentials, the personalizing adapted to enable the second party to reproduce the digital content but to prevent any unauthorized party to reproduce it, and then delivering said personalized protected digital content to the first party, the first party will get personalized digital content that he or she can give as a present to the second party so that the second party can reproduce the digital content. In this manner, the provider of the digital content can also have full control over the access to the digital content, and the provider can use any suitable method to achieve a desired degree of personalization so that unauthorized reproduction of the digital content may be effectively prevented and so forth.

If said request is transmitted to the network unit by the first party using a network request, any available communication facilities in a network may be used, e.g. for the purposes of access control.

If the first or the second party are subscribers in a communication network, the operator of the communication networks may be able to take care of billing for the request or for providing the content.

If said first or the second party are devices in a communication network, the content provider may efficiently provide the access to the digital content or billing thereof to a particular device only.

If the communication network comprises a cellular network connected to the Internet, and if the content providing system is adapted to communicate with the communication network over the Internet, already existing content providing systems may be used efficiently.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
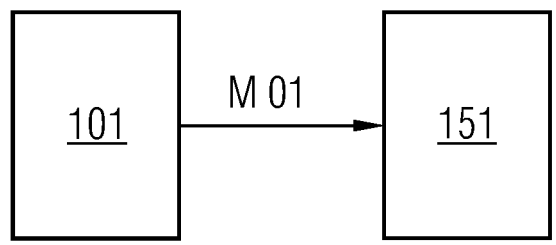
FIG. 1 illustrates registering of identity credentials.

Reference will now be made in detail to the preferred embodiments of the present invention, examples of which are illustrated in the accompanying drawings, wherein like reference numerals refer to like elements throughout.

FIG. 1 illustrates registering of identity credentials. A subscriber 101S of a communication network 100B has been issued with a certificate that contains his or her identity credentials. The subscriber 101S registers his or her identity credentials that have previously been stored in subscriber terminal 101 into a system 151 that acts as a trusted third party.

Figure 2A:
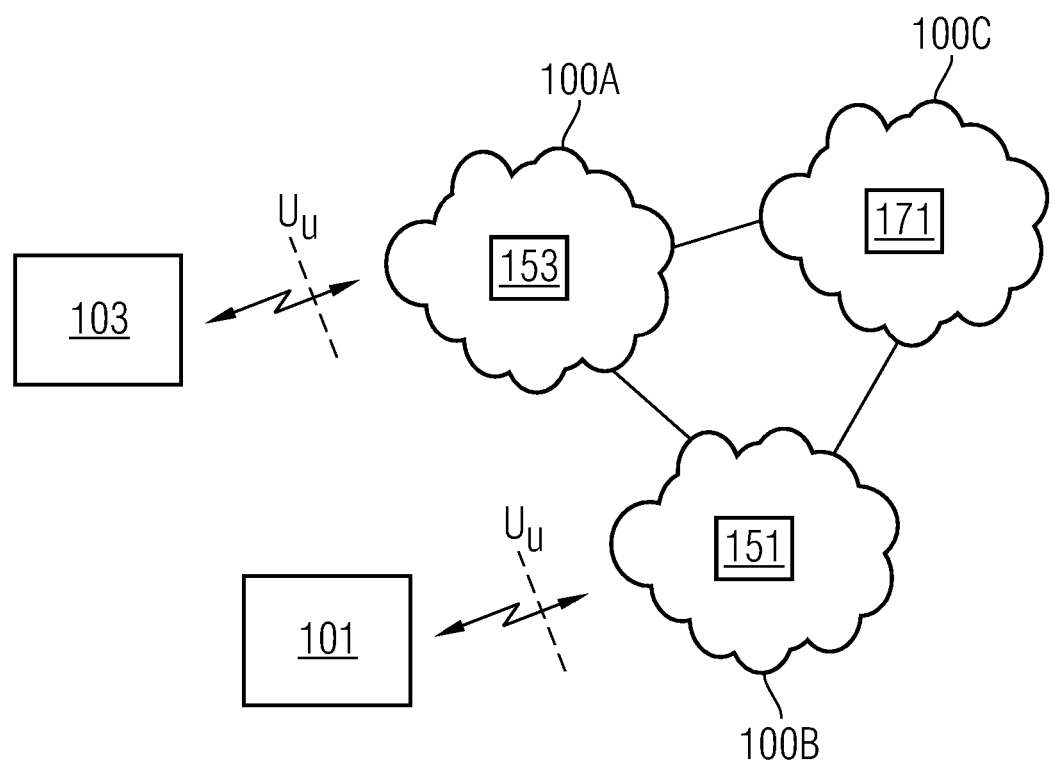
FIG. 2A is a schematic overview of a network topology.

FIG. 2A is a schematic overview of a network topology. The subscriber terminal 101 can preferably have a connection over a wireless interface Uu to the system 151 in a communication network 100B which can be a UMTS network, for example. The communication network 100B is connected to the Internet 100C, and to another communication network 100A, preferably over a packet-switched connection.

A subscriber 103S of a communication network 100A can using subscriber terminal 103, analogously to the subscriber 101S, have a connection over a wireless interface Uu to a system 153 in a communication 100A which also can be a UMTS network.

Instead of or in addition to being subscriber to communication network 100A, the subscriber 103S could be a subscriber of the communication network 100B. Similarly, the subscribers 101S, 103S could, instead of being subscribers at the communication networks 100A or 100B, be registered subscribers in a content providing system 171 which is accessible through the Internet 100C.

Figure 2B:
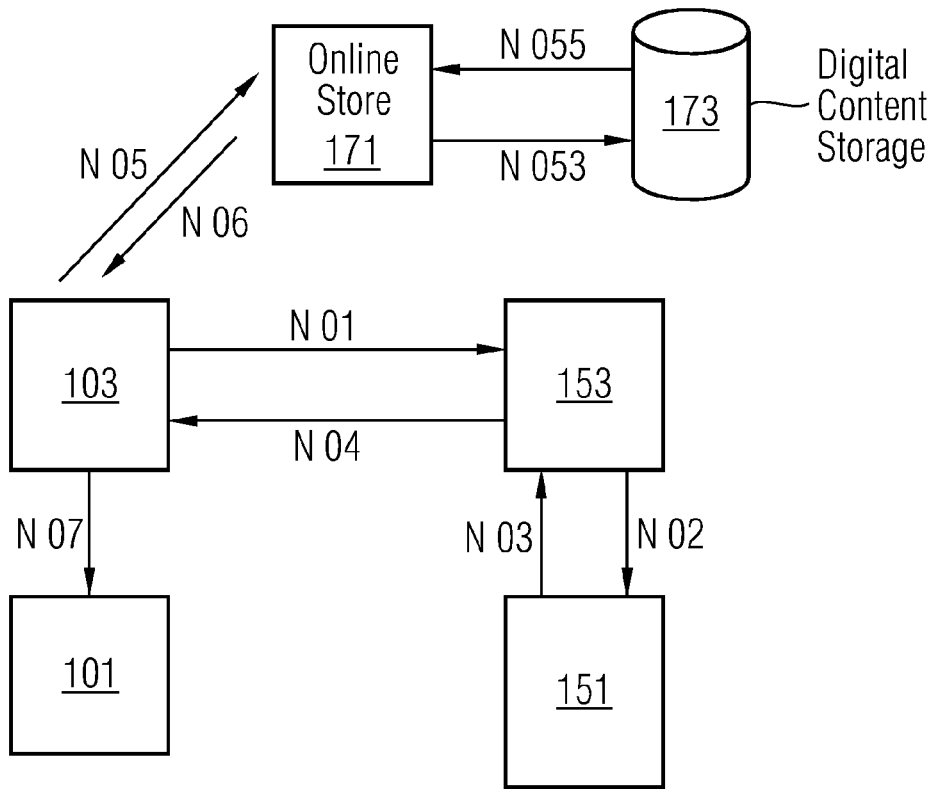
FIG. 2B illustrates messaging for enabling a first party to provide a second party with personalized digital content.

FIG. 2B illustrates messaging for enabling the subscriber 101S to provide the subscriber 103S with personalized digital content, especially digital content comprising an encoded piece of music or an encoded video clip.

A current problem in giving personalized digital content as a present may result if at least some of the identity credentials necessary for personalization are not known neither to the subscriber 103S nor to the content providing system, because in this case it is not possible for the content distributor to personalize the digital content so that the digital content could be reproduced only by subscriber 101S that receives the present.

This problem can be alleviated if a digital certificate that has been assigned to subscriber 101S has been registered with the network unit 151 in a manner as shown in FIG. 1. When subscriber 103S wants to buy personalized digital content for subscriber 101S and give it to him or her as a present, the subscriber 103S can transmit a request N01 from the subscriber terminal 103 to a network unit 153 to obtain the digital certificate that has the required identity credentials.

The subscriber 103S can retrieve identity credentials of subscriber 101S by sending a request N01 to the network unit 153 in the form of a network request. The network unit 153 then, if it already does not have the identity credentials available, make a further request N02 to network unit 151 which returns the identity credentials in response N03. The identity credentials are either returned to the subscriber terminal 103 in a message N04 or transmitted to a content providing system 171.

The subscriber 103S may then use subscriber terminal 103 to send an identifier to the content providing system 171, the identifier identifying digital content which the subscriber 103S is willing give to the subscriber 101S. The content providing system 171 also receives the identity credentials, preferably from the network unit 151 or from the subscriber terminal 103. The content providing system 171 uses the identifier to select digital content from a digital content storage 173, and retrieves the digital content from the digital content storage 173 as response N055 to request N053.

The content providing system 171 uses the identity credentials to personalize the digital content. After the personalization, the personalized digital content is delivered to the subscriber terminal 103 in message N06. In an alternative embodiment, instead of using the Internet 100C or the communication network 100A to deliver the personalized digital content to the subscriber terminal 103, the personalized digital content may stored on a storage media, such as a memory card or CD or DVD, and delivered to the subscriber 101S as usually by post or any other suitable delivery service. The subscriber 103S will not be able to reproduce the digital content that he or she has purchased for subscriber 101S.

The subscriber 103S can then send the personalized digital content over a communication network 100A or 100B or through the Internet 100C to the subscriber terminal 101. In an alternative embodiment, instead of using the Internet 100C or the communication network 100A or 100B to deliver the personalized digital content, the personalized digital content may be stored on a storage media, such as a memory card or CD or DVD, and handed over to subscriber 101S in person or delivered as usually by post or any other suitable delivery service.

After having received the personalized digital content e.g. in the message N07, the subscriber 101S is able to reproduce the digital content since it was personalized with his or her credentials. He or she may use subscriber terminal 101 to reproduce the digital content, or any other device suitable to reproduce the digital content from the personalized digital content.

The proposed idea/concept enables individuals to give DRM protected digital content to others.

Figure 3:
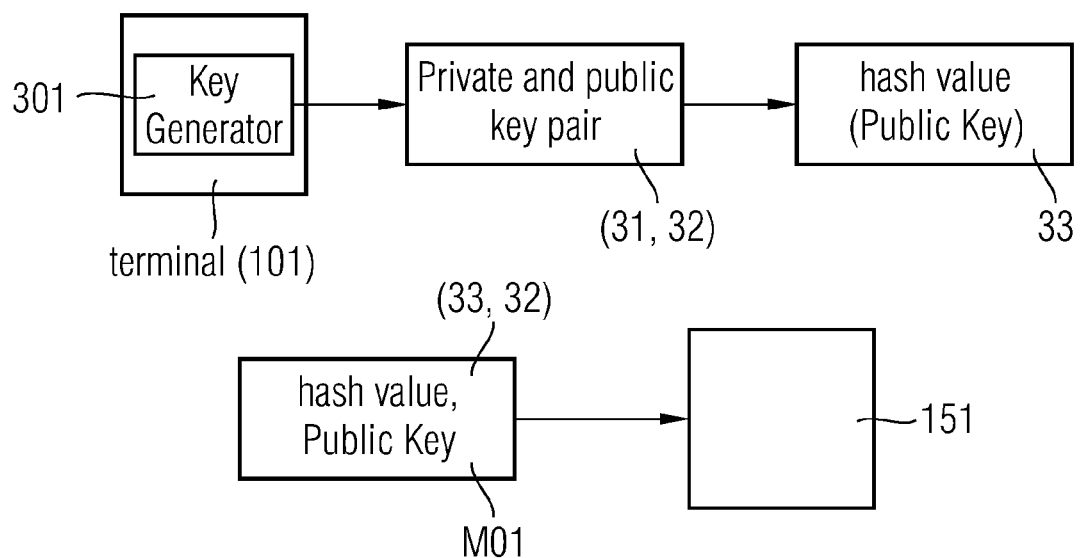
FIG. 3 shows how the privacy of the party for whom the digital content is to be personalized can be improved.

FIG. 3 shows how the privacy of the party for whom the digital content is to be personalized can be improved.

If the privacy of the subscriber 101S is to be protected better, the identity credentials may only contain a pseudonym that belongs to the subscriber 101S. Only the network unit 151, e.g. the authority that has issued the pseudonym can map a pseudonym back to subscriber 101S.

A key generator 301 in the subscriber terminal 101 creates a public and private key pair comprising a private key 31 and a public key 32. The hash value 33 of the public key is calculated and it acts as the pseudonym of the subscriber 101S.

The subscriber terminal 101 generates then message M01 which comprises the hash value 33 and the public key as in FIG. 1 to the network unit 151 which creates a certificate that contains the pseudonym and the Public key of subscriber 101S. Subscriber 103S or the content provider 171 may receive this certificate when needed. The certificate is also presented to the online store which thus receives only the pseudonym and not the true identity of the subscriber 101S, therefore improving the privacy of both subscribers 101S and 103S.

The communication network 100A or 100B may be an Internet Protocol-based network or any cellular or any other communication network also suitable for telephony. Examples of such communication networks comprise GSM (also GPRS) or CDMA networks in all commercially used radio frequency bands, Wireless LAN-based local networks, or any enterprise networks.

Instead of or in addition to a subscriber 101S or 103S being the party of a transaction, also the subscriber terminal 101 or 103 can be a party of a transaction. In this case the certificates are not subscriber-related but to subscriber terminal-related. This may especially be the case when the subscriber terminal 101 or 103 is commercially related, e.g. sold or manufactured by a party closely related to the operator of a content providing system 171, so that content may be played back only by using a suitable subscriber terminal 101 or 103.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for enabling a first user using a first terminal to provide a second user using a second terminal with personalized digital content, comprising:
   receiving a request at a network unit from the first user via the first terminal, the request comprising a first identifier identifying the second user,
   retrieving identity credentials of the second user at the network unit in response to the request;
   transmitting the identity credentials of the second user to the first user or to a content providing system;
   receiving a second identifier at the content providing system, the second identifier being received from the first user via the first terminal, the identifier identifying digital content in a digital content storage and the identity credentials of the second user;
   personalizing the digital content at the content providing system, the digital content being personalized in response to the second identifier using the identity credentials, the digital content being personalized to enable the second user to reproduce the digital content but to prevent any unauthorized user to reproduce it; and
   delivering the digital content, as personalized, to the first user at the first terminal;
   wherein the first user and the second user are subscribers of a cellular communication network connected to the Internet and the content providing system is adapted to communicate over the Internet.

2. The method according to claim 1, wherein the request is transmitted to the network unit by the first user using a network request.

3. The method according to claim 2, wherein the first user is a device in the cellular communication network.

4. The method according to claim 2, wherein the second user is a device in the cellular communication network.

5. The method according to claim 1, wherein the first user is a device in the cellular communication network.

6. The method according to claim 1, wherein the second user is a device in the cellular communication network.

7. The method according to claim 1, wherein the digital content comprises an encoded piece of music, or an encoded video clip.

8. A system for enabling a first party using a first terminal to provide a second party using a second terminal with personalized digital content, comprising:
   a content providing system; and
   a network unit to:
      receive a request from a first party via the first terminal, the request comprising a first identifier identifying a second party;
      retrieve identity credentials of the second party in response to the request; and
      transmit the identity credentials of the second party to the first party or to a content providing system, wherein the content providing system:
   receives a second identifier from the first party and the identify credentials of the second party, the second identifier identifying digital content in a digital content storage;
   personalizes digital content using the identity credentials to enable the second party to reproduce the digital content but to prevent any unauthorized party to reproduce it; and
   delivers the digital content, as personalized, to the first party at the first terminal; wherein the first user is a device in a cellular communication network and the second user is a device in a cellular communication network;
   wherein the first user and the second user are subscribers of the cellular communication network connected to the Internet and the content providing system is adapted to communicate over the Internet.

9. The system according to claim 8, wherein the first user has a transmitter to transmit the request to the network unit as a network request.

10. The system according to claim 8, wherein the digital content comprises an encoded piece of music or an encoded video clip.

11. A method for enabling a first user using a first terminal to provide a second user using a second terminal with personalized digital content, comprising:
   receiving a request at a network unit from the first user via the first terminal, the request comprising a first identifier identifying the second terminal, retrieving identity credentials of the second terminal at the network unit in response to the request;
   transmitting the identity credentials of the second terminal to the first user or to a content providing system;
   receiving a second identifier at the content providing system, the second identifier being received from the first user via the first terminal, the identifier identifying digital content in a digital content storage and the identity credentials of the second terminal;
   personalizing the digital content at the content providing system, the digital content being personalized in response to the second identifier using the identity credentials, the digital content being personalized to enable the second terminal to reproduce the digital content but to prevent any unauthorized terminal to reproduce it; and
   delivering the digital content, as personalized, to the first user at the first terminal;
   wherein the first user and the second user are subscribers of a cellular communication network connected to the Internet and the content providing system is adapted to communicate over the Internet.

\* \* \* \* \*

UNITED STATES PATENT AND TRADEMARK OFFICE
CERTIFICATE OF CORRECTION

PATENT NO. : 8,122,516 B2  
APPLICATION NO. : 11/918072  
DATED : February 21, 2012  
INVENTOR(S) : Jorge Cuellar et al.

Page 1 of 1

It is certified that error appears in the above-identified patent and that said Letters Patent is hereby corrected as shown below:

Column 6, Line 5, In Claim 8, delete "identify" and insert -- identity --, therefor.

Signed and Sealed this
Twenty-fifth Day of September, 2012

David J. Kappos
*Director of the United States Patent and Trademark Office*